US005152043A

United States Patent [19]

Plasse et al.

[11] Patent Number: 5,152,043

[45] Date of Patent: Oct. 6, 1992

[54] SELF-CONTAINED LOCK WIRE SECURING TOOL

[75] Inventors: Michel L. Plasse, Hackensack; Robert H. Koehler, Secaucus; William E. Koehler, North Bergen, all of N.J.

[73] Assignee: Bergen Cable Technologies, Inc., Lodi, N.J.

[21] Appl. No.: 655,143

[22] Filed: Feb. 14, 1991

Related U.S. Application Data

[63] Continuation of Ser. No. 533,857, Jun. 6, 1990, abandoned.

[51] Int. Cl.[5] ....... B23P 19/00

[52] U.S. Cl. ....... 29/252; 29/282

[58] Field of Search ....... 254/29 A; 29/252, 255, 29/280, 282, 283.5, 452, 788, 952

[56] References Cited

U.S. PATENT DOCUMENTS 847,776 3/1907 Huising .
1,147,845 7/1915 Brooks .
1,182,602 5/1916 Tuohy .
1,277,305 8/1918 Gerrard .
1,408,846 3/1922 Turner .
1,555,819 10/1925 Baruch .
1,807,479 5/1931 James .
2,267,532 12/1941 Moberg .
2,764,861 10/1956 Wenk, Jr. .
3,353,227 11/1967 Kabel .
3,570,554 3/1971 Kabel .
3,658,296 4/1972 Yegge .
3,911,970 10/1975 Lundberg et al. .
4,747,433 5/1988 Dixon .
5,052,094 10/1991 Plasse et al. ....... 29/282

*Primary Examiner*—Robert C. Watson
*Attorney, Agent, or Firm*—Bacon & Thomas

[57] ABSTRACT

A device is disclosed for automatically inserting a ferrule over a safety cable, tensioning the cable and crimping the ferrule onto the safety cable, and cutting off excess cable. The apparatus is used with a safety cable having a ferrule applied to one end and which is placed through a plurality of threaded fasteners in a pattern. A free end is inserted through a ferrule held in the device and gripped by a tension cylinder. Movement of the tension cylinder exerts a predetermined tension on the safety cable. The device then crimps the ferrule onto the safety cable to retain the safety cable in place at the desired tension. The end of the safety cable extending beyond the attached ferrule is automatically cut off to complete the process.

5 Claims, 7 Drawing Sheets

SELF-CONTAINED LOCK WIRE SECURING TOOL

This application is a continuation of application Ser. No. 07/533,857, filed Jun. 6, 1990, now abandoned.

BACKGROUND OF THE INVENTION

The present invention relates to a tool for applying a ferrule to a lock wire passing through a plurality of threaded fasteners to prevent the unintentional unthreading of such fasteners.

In rotating machinery having close tolerances between rotating and stationary elements, such as turbines, it is imperative that all objects, no matter how small, be kept from contact with the rotating elements of the machinery. The presence of any foreign object could result in the catastrophic failure of the entire machine.

Such machinery is inherently complex and requires many nuts, bolts, screws and other threaded fasteners to assemble all of its components. Since the operation of such machinery may involve very high rotating speeds, which may induce vibrations into the machine elements, it is necessary to provide some means for preventing the inadvertent unthreading of the numerous threaded fasteners.

It is known to apply lock wires to threaded fasteners to prevent their inadverent unthreading. Typically, the lock wire passes through a transverse hole in at least two threaded fasteners and is twisted back on itself in alternating clockwise and counterclockwise directions between the threaded fasteners. The process is duplicated between additional threaded fasteners until the entire threaded fastener pattern has been wired. Following the required stringing and twisting, the lock wire is cut and bent into a certain position.

While the known lock wire technique has provided satisfactory results, it requires a very time consuming and laborious application process. Often the final result is unsatisfactory due to variations in the quantity and tautness of the twists, and the variations in the tension of the lock wire. It has been estimated that annual losses of approximately $10,000,000 are incurred just from reworking unacceptable lock wire assemblies.

SUMMARY OF THE INVENTION

The present invention relates to a device for automatically inserting a ferrule over the safety cable, tensioning the wire crimping the ferrule onto the safety cable, and cutting off the excess cable.

The apparatus is used with a safety cable having a ferrule applied to one end and which is placed through a plurality of threaded fasteners in the pattern. A free end is inserted through a ferrule (held in the apparatus) and clamped onto a tension cylinder. Movement of the tension cylinder exerts a predetermined tension on the safety cable. The device then crimps the ferrule onto the safety cable to retain the safety cable in place at the desired tension. The end of the safety cable extending beyond the attached ferrule is cut off automatically by the tool to complete the process.

The device eliminates the necessity of hand twisting the lock wire and the problems associated with this technique.

DETAILED DESCRIPTION OF THE PREFERRED EMBODIMENT

Figure 1:
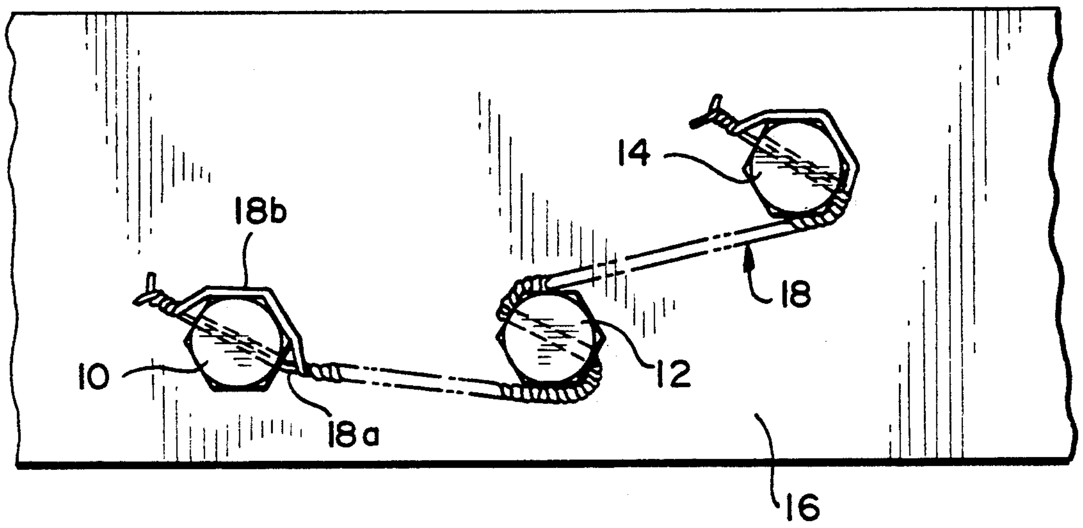
FIG. 1 (PRIOR ART)
FIG. 1 is a plan view of a safety cable applied with the known techniques.

A lock wire applied by known techniques is illustrated in FIG. 1 wherein threaded fasteners 10, 12 and 14 are engaged with a portion 16 of a rotating apparatus (not otherwise shown). The lock wire 18 comprising two strands 18*a* and 18*b* twisted together at one end are separated such that strand 18*a* passes through a transverse opening in fastener 10 while strand 18*b* passes around the exterior of the fastener 10. The strands are twisted together on the opposite side of fastener 10 and pass through a transverse opening formed in fastener 12. The lock wire 18 continues until the last fastener, in this particular instance fastener 14, whereupon one strand passes through a transverse opening in the fastener, while the other strand passes around and contacts the exterior of the fastener. The strands are twisted together on the opposite side of the fastener 14.

Figure 2:
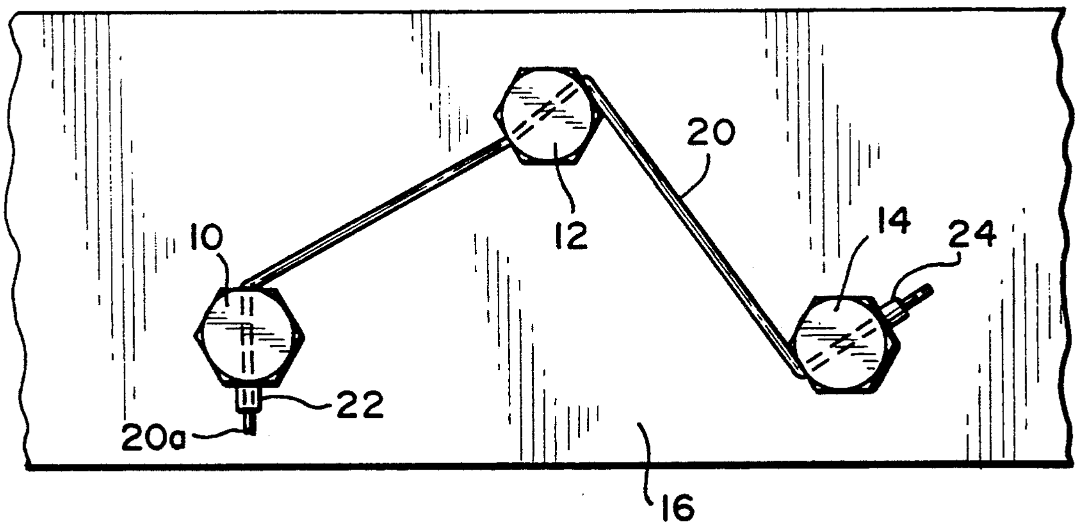
FIG. 2 is a plan view of a safety cable wire applied using the apparatus according to the present invention.

FIG. 2 illustrates a safety cable system applied using the apparatus according to the present invention. Threaded fasteners 10, 12 and 14 are once again engaged with the machinery portion 16. Lock wire 20 comprises a multi strand cable having a ferrule 22 affixed to end 20*a*. Safety cable 20 passes through transverse openings formed in the threaded fasteners 10, 12 and 14 until ferrule 22 bears against one side of fastener 10. At this point, ferrule 24 is inserted over the end of cable 20 against the side of fastener 14, a tension is applied to the safety cable 20 and the ferrule 24 is crimped onto the safety cable such that it bears against a side of the fastener 14. Safety cable 20 is then automatically trimmed. The pre-determined is tension is maintained in safety cable 20 by the contact of ferrules 22 and 24 with the sides of the threaded fasteners 10 and 14, respectively.

Figure 3:
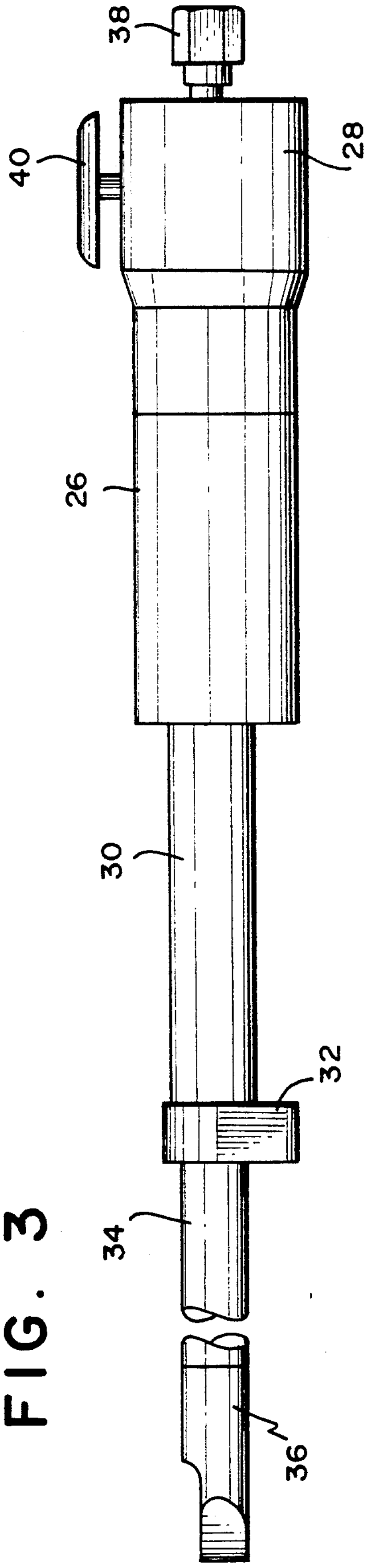
FIG. 3 is a side elevational view of the apparatus according to the present invention.

The device for applying tension to the safety cable and applying the ferrule can be seen best in FIG. 3 and comprises a tension cylinder 26, a valve assembly 28 and a tension piston 30 slidably mounted in the tension cylinder and having a portion extending exteriorly of the tension cylinder 26 upon which is mounted wire gripper 32. Outer tube 34 extends generally concentrically through the tension cylinder 26 and the tension piston 30, and has crimping head 36 attached to its distal end. Fitting 38 attaches the valve assembly 28 to a source of pressurized fluid, while valve actuator button 40 actuates the valve of the valve assembly 28.

Although the tool according to the present invention has been successfully operated and will be described as using compressed air as the pressurized fluid, it is to be understood that other pressurized fluids may be utilized without exceeding the scope of this invention.

Figure 4:
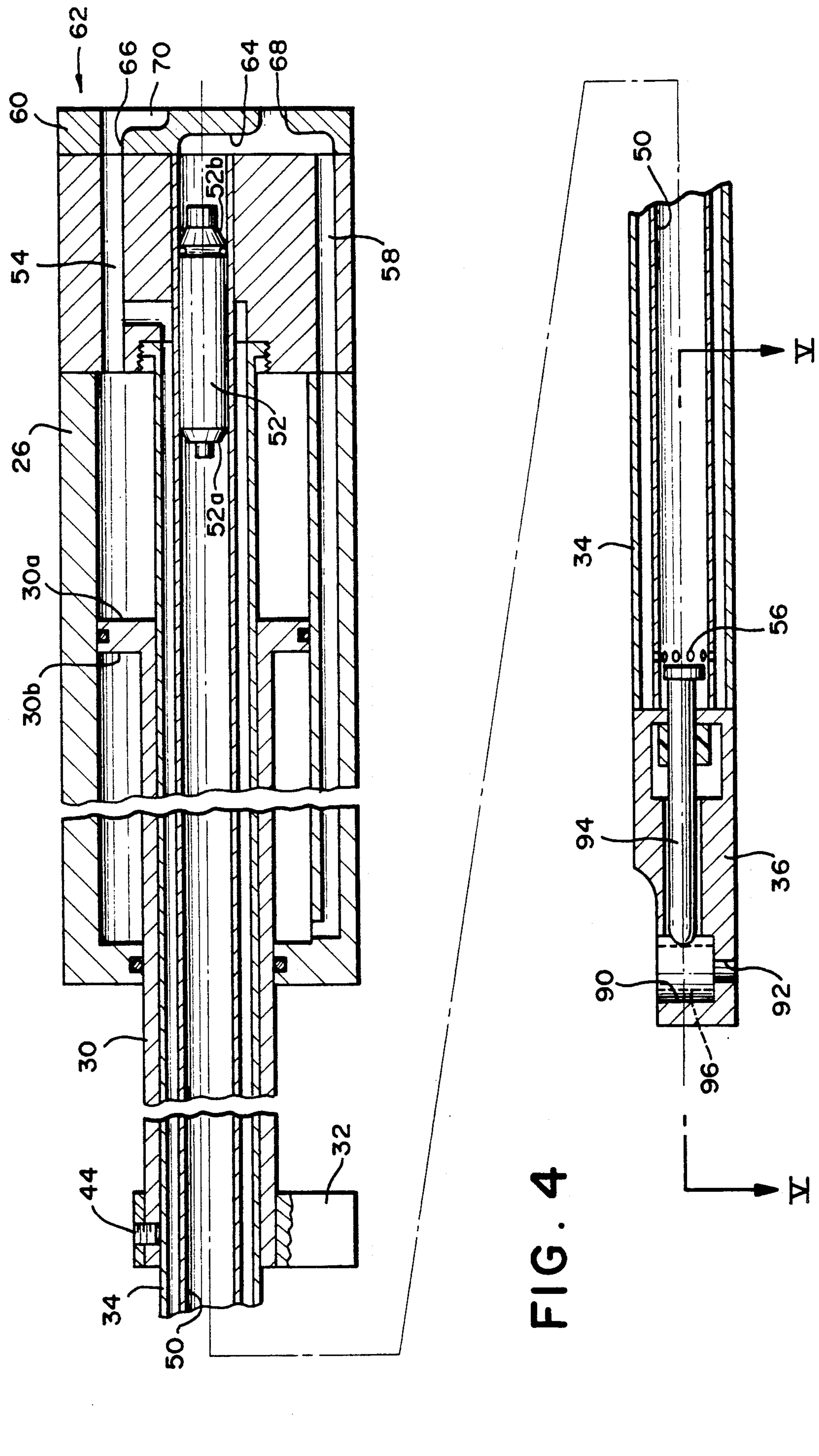
FIG. 4 is a partial, longitudinal cross-sectional view of the apparatus shown in FIG. 3.

A longitudinal cross-sectional view of the tension cylinder 26, the tension piston 30, the outer tube 34 and the crimping head 36 is illustrated in FIG. 4. As can be seen, tension piston 30 is slidably mounted within tension cylinder 26. Tension piston 30 has a piston portion with a first face 30*a* and a second face 30*b* located on opposite sides, as well as a portion which extends exteriorly of the tension cylinder 26.

Figure 7:
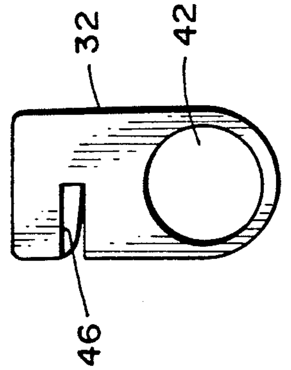
FIG. 7 is a front view of the wire gripping device shown in FIG. 6.
Figure 6:
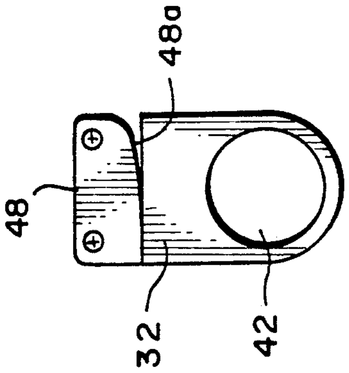
FIG. 6 is a rear view of the wire gripping device used with the present invention.

Wire gripper 32 is fixedly attached to the exterior end of the tension piston 30. As illustrated in FIGS. 6 and 7, wire gripper 32 defines an opening 42 which slidably accommodates the end of the tension piston 30. The wire gripper 32 may be fixedly attached to the tension piston 30 by set screw 44 or similar means. Wire gripper 32 defines a longitudinally extending slot 46 passing inwardly from one side and has mounted on its rear portion, a gripper plate 48 such that a portion of gripper plate 48 extends over the rear of the slot 46. An edge 48*a* of the plate 48 is tapered with respect to the sides of the slot 46 such that a safety cable inserted into the slot 46 from the open side and urged toward the center of the gripper 32 will be gripped by the edge 48*a* of the plate 48.

A guide tube 50 is concentrically arranged within the outer tube 34, tension cylinder 26 and the tension piston 30, and extends substantially from the rear portion of the tension cylinder 26 to the gripping head 36. Guide tube 50, which may be formed of brass or similar material, slidingly receives crimping piston 52 in its interior. The dimensions of the exterior of crimping piston 52 and the interior of guide tube 50 are such that crimping piston 52 will readily slide within the guide tube, but will not allow the passage of a significant amounts of pressurized air between them. It may also be possible to use a seal attached to the crimping piston 52 to slidably seal against the inner surface of guide tube 50.

Guide tube 50 is also concentrically arranged within outer tube 34 so as to define an annular space there between. This annular space communicates with a first passage 54 defined by the tension cyliner 26 as illustrated in FIG. 24. Passageway 54 also provides communication with the interior of the tension cylinder 26 such that pressurized air passing through this passage 54 will act on first fact 30*a* of tension piston 30. Since passage 54 also communicates with the annular space between outer tube 34 and guide tube 50, pressurized air will also enter this space and communicate with the interior of the guide tube 50 via a plurality of holes 56 formed near the cutting head end of guide tube 50. Pressurized air passing through passage 54, and the annular space, holes 56 and the interior of guide tube 50 will act on a first end 52*a* of the crimping piston 52.

Tension cylinder 26 defines a second passage 58 which communicates with the interior of tension cylinder 26 such that pressurized air passing through passage 58 will act on the second face 30*b* of tension piston 30. As also illustrated in FIG. 4, second passage 58 communicates with the interior of the guide tube 50 via slot 64, so that any pressurized fluid within this passage will also act on the second end 52*b* of crimping piston 52.

Figure 8:
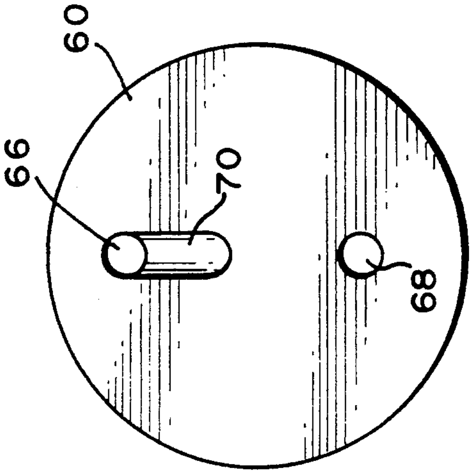
FIG. 8 is a rear view of a tension cylinder plate used in conjunction with the present invention.
Figure 9:
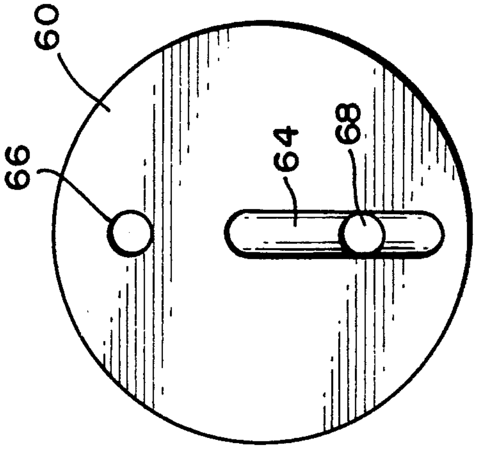
FIG. 9 is a front view of the tension cylinder plate shown in FIG. 8.

FIGS. 8 and 9 illustrate rear and front views of a tension cylinder end plate 60, the cross-sectional side view of which is illustrated in FIG. 4. FIG. 8 illustrates the rear view end plate 60 (when viewed in the direction or arrow 62 in FIG. 4), while FIG. 9 illustrates the opposite or front side of the end plate. AS seen in FIG. 9, the front face of end plate 60 defines a slot 64 which facilitates communication between the passage 58 and the interior of guide tube 50. The front face also defines an opening 66 which communicates with passage 54. On the opposite, or rear, side of end plate 60, opening 68 communicates with slot 64, while opening 66 communicates with slot 70.

Figure 12:
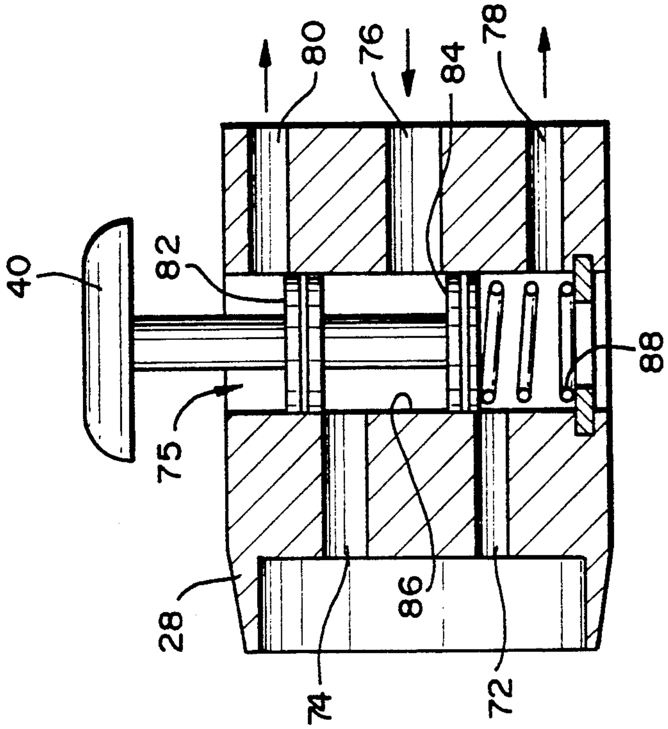
FIG. 12 is a longitudinal, cross-sectional view of the valve assembly used with the apparatus according to the present invention.

Valve assembly 28 attaches to the end of the tension cylinder 26 and the end plate 60, as illustrated in FIG. 3. Valve assembly 28 is shown in detail in FIG. 12 and comprises a valve housing defining outlet ports 72 and 74 which communicate with openings 68 and slot 70 formed in the rear or end plate 60, respectively. A generally vertically oriented spool assembly 75 is slidably mounted in valve assembly 28, such that pressurized fluid inlet port 76, which is attached to a source of pressurized air via fitting 38, selectively communicates with either outlet port 72 or outlet port 74. Ports 78 and 80 also formed as part of the valve housing serve as return vents and may be open to atmospheric pressure.

Valve assembly 75 may comprise a spool valve having lands 82 and 84 sealingly slidable against the inner surface of opening 86 formed in the valve housing. Spring 88 bears against the lower land 84 so as to urge the valve assembly 85 upwardly to the position shown in FIG. 12. In this first or normal position, the pressurized air inlet 76 communicates with outlet port 74 while port 72 is vented through port 78. When the valve assembly 75 is pushed downwardly via actuator button 40, land 82 will prevent fluid communication between inlet port 76 and outlet port 74. This movement will also move land 84 downwardly so as to allow communication between the inlet port 76 and the outlet port 72. In this downward position, outlet port 74 will then be vented through port 80.

Figure 5:
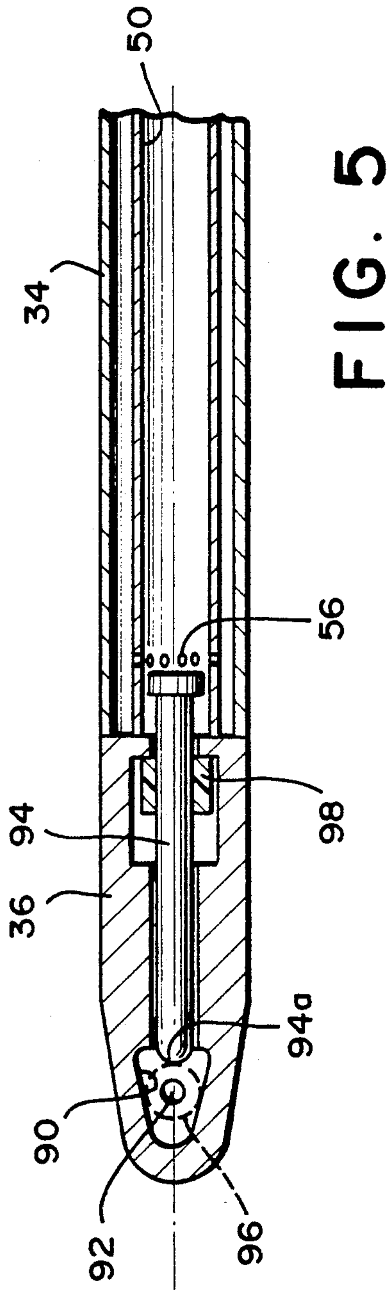
FIG. 5 is a partial cross-sectional view of the crimping head of the apparatus according to the present invention taken along the V—V in FIG. 4.

As can be seen in FIGS. 4 and 5, crimping head 36 defines a generally triangularly shaped opening 90 which may extend only partially through the height of the crimping head 36. Opening 92 extends from the bottom of opening 90 to the opposite side of the crimping head 36 to facilitate the passage therethrough of the lock wire.

A crimping punch 94 is operatively associated with the crimping head 36 and extends through the crimping head 36 such that an end portion 94*a* extends into the opening 90. An opposite end of the crimping punch 94 extends into the interior of the guide tube 50. The crimping punch 94 is readily slidable within the guide tube 50 as well as the crimping head 36 such that the impact force exerted on the crimping panel 94 by the crimping piston 52 will push the crimping punch 94 into a ferrule held in opening 90 with sufficient force to permanently deform the ferrule and attach it to a safety cable.

The crimping punch 94 also serves as a means to hold a ferrule in the opening 90 with sufficient frictional, non-deforming force to enable the tool to be manipulated into any position without the ferrule falling out of the opening 90. When ferrule 96, illustrated in dotted lines in FIGS. 4 and 5, is manually inserted into the opening 90, it bears against end portion 94*a* of the crimping punch 94 such that the crimping punch 94 is urged slightly attached to the shank of the crimping punch 94 is moved in resilient contact with the end of the crimping head 36. Resilient sleeve 98 resiliently urges crimping punch 94 towards the left, as viewed in FIGS. 4 and 5, with sufficient force to hold the ferrule 96 within the opening 90, but with a force insufficient to cause any deformation of the ferrule. Thus, the ferrule is frictionally retained between the end 94*a* of the crimping punch 94 and the two side walls of the generally triangularly shaped opening 90.

Figure 10:
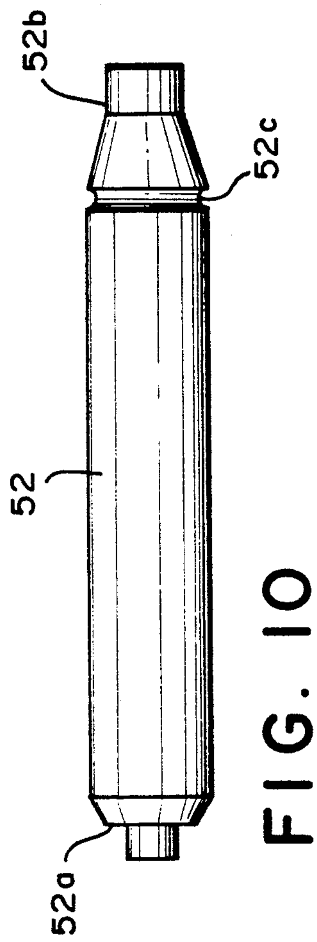
FIG. 10 is a side view of the ferrule crimping piston used with the apparatus according to the present invention.
Figure 11:
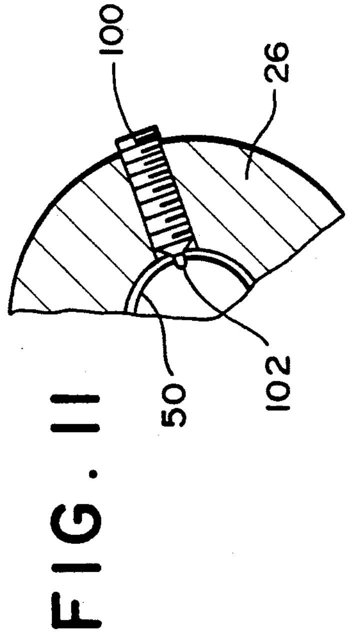
FIG. 11 is a partial, transverse, cross-sectional view illustrating the ferrule crimping piston retainer used with the present invention.

The tool according to the invention also provides means to retain the crimping piston 52 in a retracted position displaced away from crimping punch 94. This position is generally indicated in FIG. 4 and is toward the rear end of the tension cylinder 26. As illustrated in this figure as well as in FIG. 10, crimping piston 52 defines an annular groove 52*c* extending around its periphery near second end 52*b*. Groove 52*c* is adapted to be engaged by a plurality of screw retainers 100 that extend through the wall of the rear portion of tension cylinder 26. One of these screw retainers is illustrated in FIG. 11 and comprises a threaded shank portion that is threadingly engaged with a wall of the tension cylinder 26 and a slotted head portion accessible from the exterior of tension cylinder 26 so that the radial position of the screw retainer may be readily adjusted merely by threading and unthreading its relative to the tension cylinder 26. The radial inner end portion of the screw retainer element 100 has a spring biased ball 102 that is biased in a radially inward direction, as viewed in FIG. 11, but which may be radially displaced in an outward direction. As is well known in the art, these retaining elements may be radially positioned within the tension cylinder 26 such that the end with the ball 102 extends through the guide tube 50 into the interior of the guide tube 50. When balls 102 engage groove 52*c*, the crimping piston 52 is retained in its retracted position. As will be described in more detail hereinafter, the fluid pressure acting on the rear portion 52*b* will initially be insufficient to overcome the retaining force exerted on crimping piston 52 by the screw retainer 100. However, when the pressure acting on end 52*b* reaches a predetermined value, it overcomes the retaining force and forces the crimping piston 52 along guide tube 50 into contact with the crimping punch 94 with sufficient force to deform the ferrule 96 and lock it onto the lock wire.

Figure 13:
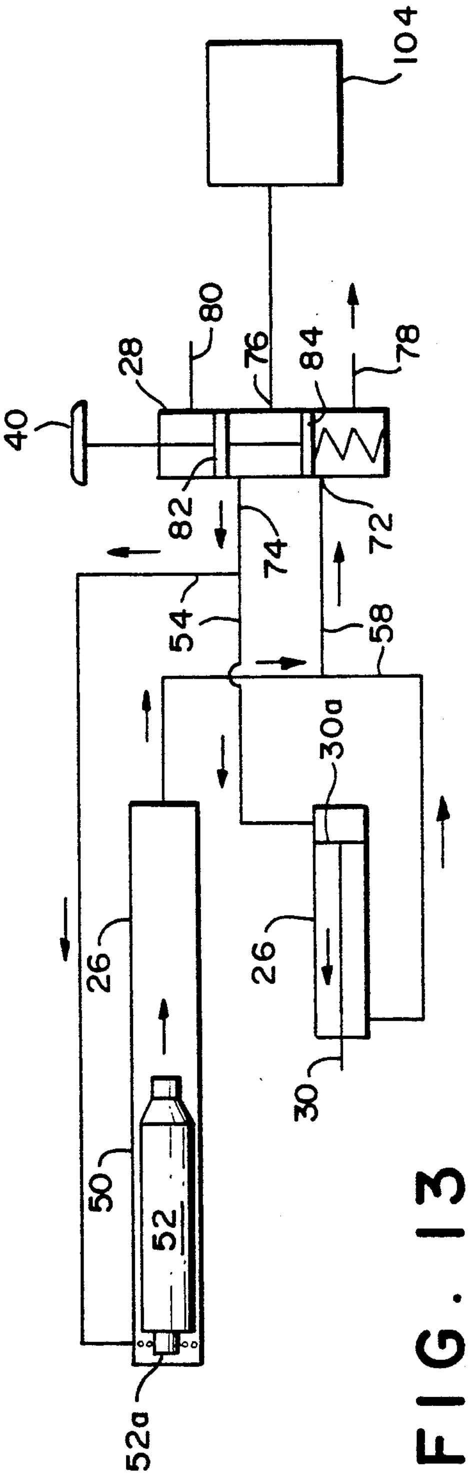
FIG. 13 is a schematic diagram illustrating the fluid flow when the valve is in a first position.
Figure 14:
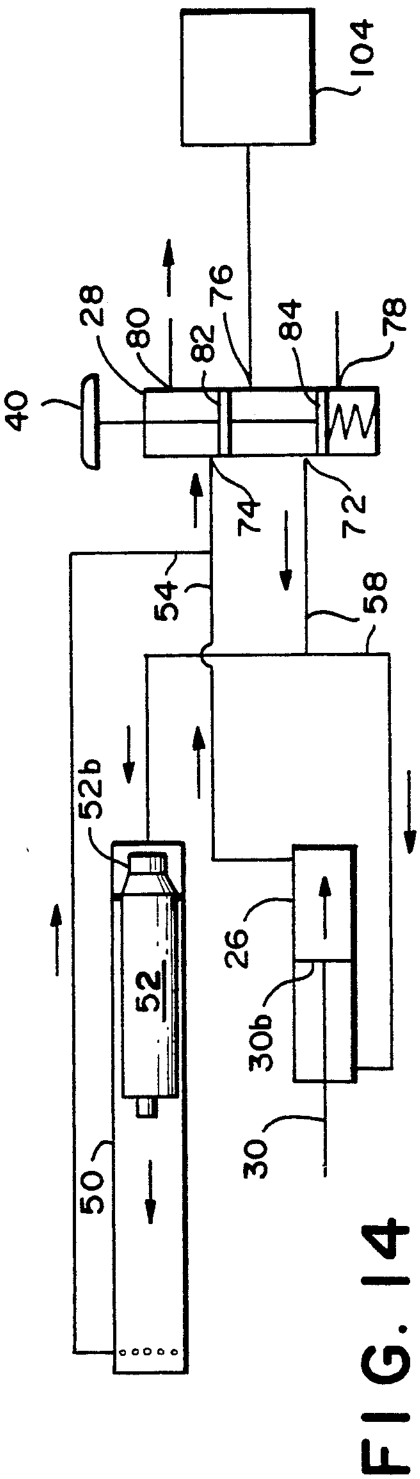
FIG. 14 is a schematic diagram illustrating the fluid flow when the valve is in a second position.
Figure 15:
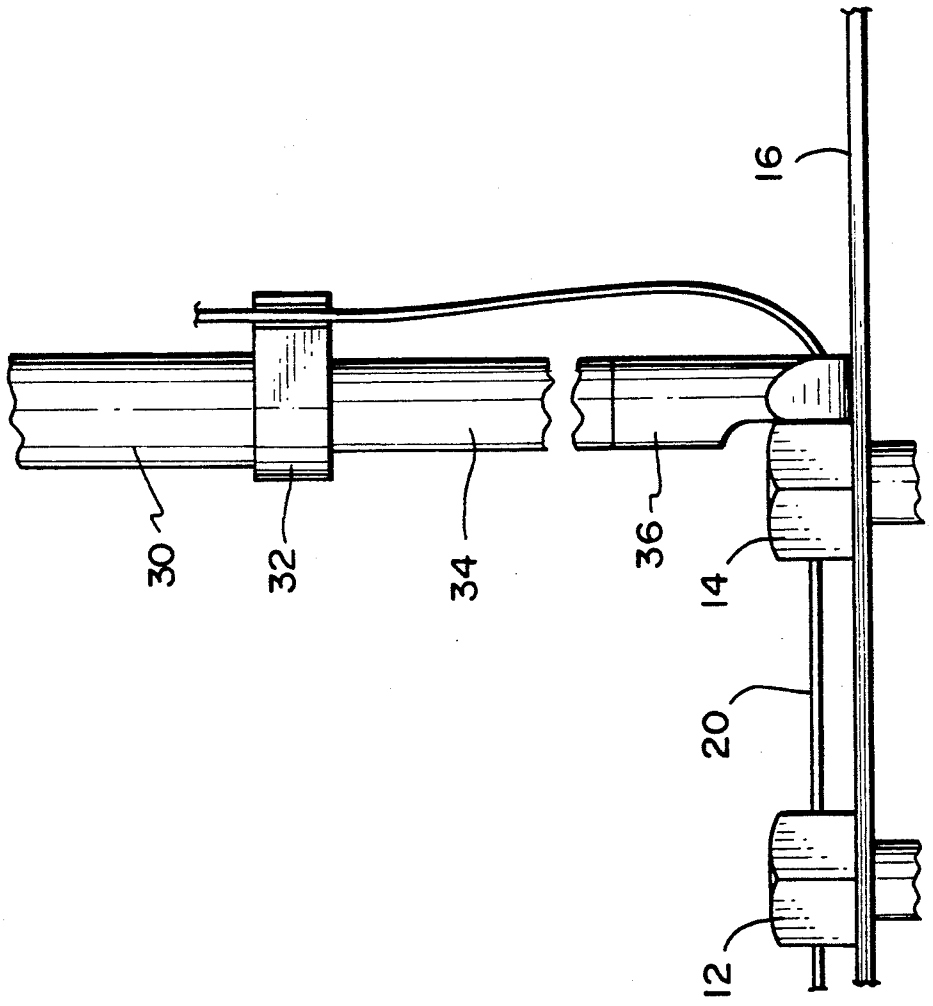
FIG. 15 is a side view of the apparatus according to the present invention applying a ferrule to a safety cable.

The operation of the tool will now be described with particular reference to FIGS. 13, 14 and 15. As illustrated in FIG. 13, when valve element 75 is in its normal position, inlet port 76, which is connected to a source of pressurized fluid 104 communicates with outlet port 74. This applies pressurized air to passage 54 through slot 70 and opening 66 such that the pressurized fluid acts on side 30*a* of tension piston 30, thereby urging the tension piston 30 toward the left as viewed in FIGS. 13 and 4 until tension piston 30 reaches an extreme position. The fluid pressure also acts on the first end 52*a* of the crimping piston 52 to urge it toward the right, as viewed in FIGS. 4 and 13 with sufficient force such that groove 52*c* will be engaged by the balls 102 of the locking elements 100. The air within the interior of guide tube 50 on the opposite side of piston 52 as well as in tension cylinder 26 on the opposite side of tension piston 30 will be vented to atmosphere via passage 58, slot 64, opening 68 and valve ports 72 and 78.

When tension cylinder 30 reaches its most extreme extended position and crimping piston 52 is retained in its retracted position, as illustrated in FIG. 4, the tool is ready for use. A ferrule is manually inserted into opening 90 and, as previously discussed, is retained therein by frictional contact with crimping punch 94. The tool may be manipulated such that lock wire 20 passes through the ferrule, retained in opening 90, and opening 92, as illustrated in FIG. 15. After the safety cable 20 has been inserted through the ferrule and the opening 92, the distal end is placed into and gripped by wire gripper 32. The tool is then positioned such that the gripping head 36 is against the side of the fastener 14 and valve actuator button 40 is manually depressed. This moves the lands 82 and 84 to the positions shown in FIG. 14. Thus, pressurized air inlet 76 now communicates with passage 58 through valve outlet port 72 opening 68 and slot 64. The pressurized air acts on face 30*b* of tension piston 30 to urge it toward the light as viewed in FIGS. 4 and 14.

Pressurized air also acts on the second end 52*b* of crimping piston 52. However, the retaining elements 100 are now engaged with the groove 52*c* and prevent any movement of crimping piston 52. Movement of tension piston 30 continues until the wire 20 has been tensioned to a predetermined amount. At this time movement of the tension piston 30 ceases thereby causing the pressure acting on end 52*b* of the crimping piston 52 to increase. This increase in pressure subjects the crimping piston 52 to forces sufficient to overcome the retaining elements 100, thereby urging crimping piston 52 rapidly toward the left, as illustrated in FIGS. 4 and 14 through guide tube 50 and into contact with the crimping punch 94. The impact between the crimping piston 52 and the crimping punch 94 is such that crimping punch 94 deforms the ferrule 96 and locks it onto the lock wire 20.

Once the crimping operation has been completed, the push button 40 is released thereby returning the lands 82 and 84 to their positions shown in FIG. 13. This allows the pressurized air to return the crimping piston 52 to its retracted position and to also move the tension piston 30 to its initial, extended position. The safety cable extending between the opening 92 and the wire gripper 32 may then be cut off and the tool removed. The frictional force exerted on the ferrule by the crimping punch 94 is insufficient to dislodge it from the safety cable after it has been crimped. Once the tool had been removed, the tension piston 30 and the crimping piston 52 are in their positions ready for a subsequent crimping operation.

While the wire gripper 32 has been shown to be oriented such that it grips a wire after having passed through the ferrule, it should be understood that both the wire gripper 32 as well as the tension piston 30 may be rotated about the longitudinal axis of the tool so as to achieve any desired orientation of the wire gripper. Then length and size of the crimping head and the outer tube may be made to any dimension so as to facilitate the application of ferrules and lock wires to positions that were heretofore rendered inaccessible by known lock wire techniques.

The foregoing description is provided for illustrative purposes only and should not be construed as in any way limited this invention, the scope of which is defined solely by the appended claims.

What is claimed is:

1. A tool for applying a ferrule to a strand element such as a wire or cable, comprising:

a tool body comprising at least a pair of fluid actuated motors within the body;

control valve means associated with the tool body for controlling the fluid actuated motors;

means for admitting pressurized fluid to the motors under the control of the control valve means;

means associated with the tool body for receiving and supporting a tubular ferrule element;

strand tensioning means associated with the tool body for gripping and tensioning a strand element threaded through the ferrule element;

a ferrule crimping punch means for engaging the ferrule element and inwardly crimping same associated with the tool body;

said strand gripping and tensioning means, and said ferrule crimping punch means, each arranged so as to be actuated by a respective fluid actuated motor.

2. A tool as claimed in claim 1, wherein said tool has a longitudinal axis, and wherein said means for receiving and supporting a tubular ferrule element is disposed to receive and support a ferrule so that it extends transversely of the tool longitudinal axis; and wherein said strand tensioning means is actuated by its respective fluid actuated motor so that it is displaced along the tool's longitudinal axis to tension a strand element threaded through a ferrule.

3. A tool as claimed in claim 1, wherein said control valve means comprises a single valve assembly for directing actuating fluid to both fluid actuated motors.

4. A tool as claimed in claim 1, including means for delaying actuation of the crimping punch actuation motor until a predetermined increase inactuating pressure occurs in the strand gripping means actuating motor following actuation of the latter.

5. A tool as claimed in claim 4, wherein the ferrule crimping punch fluid actuated motor comprises a free piston arranged to impact against the ferrule crimping punch means when driven by actuating fluid; and said means for delaying actuation of the crimping punch actuating motor comprises a temporary retaining means for securing the free piston and the tool body until a predetermined fluid pressure actuating force is directed against the piston.

* * * * *